(12) United States Patent
Nishio (10) Patent No.: US 8,467,638 B2
(45) Date of Patent: Jun. 18, 2013

(54) SUSPENSION BOARD WITH CIRCUIT (75) Inventor: Hajime Nishio, Osaka (JP)

(73) Assignee: Nitto Denko Corporation, Osaka (JP)

( * ) Notice: Subject to any disclaimer, the term of this patent is extended or adjusted under 35 U.S.C. 154(b) by 226 days.

(21) Appl. No.: 12/926,354

(22) Filed: Nov. 12, 2010

(65) Prior Publication Data

US 2011/0123145 A1    May 26, 2011

(30) Foreign Application Priority Data

Nov. 26, 2009   (JP) .................................. 2009-269158

(51) Int. Cl.
*G02B 6/12* (2006.01)
*G11B 5/48* (2006.01)

(52) U.S. Cl.
USPC ........................... 385/14; 360/245.8; 360/246

(58) Field of Classification Search
USPC .............................................. 360/245.8, 246
See application file for complete search history.

(56) References Cited

U.S. PATENT DOCUMENTS

| | | | |
|---|---|---|---|
| 5,872,884 A | 2/1999 | Mizuuchi et al. |
| 7,033,457 B2 | 4/2006 | Kim et al. |
| 7,440,236 B1 | 10/2008 | Bennin et al. |
| 7,546,003 B2 | 6/2009 | Juni et al. |
| 2001/0055453 A1 | 12/2001 | Mizuuchi et al. |
| 2003/0059151 A1 | 3/2003 | Brist et al. |
| 2006/0187564 A1 | 8/2006 | Sato et al. |
| 2007/0177302 A1 | 8/2007 | Shimazawa et al. |
| 2007/0242921 A1 | 10/2007 | Matsumoto |
| 2008/0115962 A1 | 5/2008 | Juni et al. |
| 2008/0130155 A1 | 6/2008 | Naniwa et al. |
| 2008/0151431 A1 | 6/2008 | Tanaka et al. |
| 2009/0032299 A1 | 2/2009 | Khan |
| 2010/0007980 A1 | 1/2010 | Kim et al. |
| 2010/0176827 A1 | 7/2010 | Yamazaki et al. |
| 2010/0188779 A1 | 7/2010 | Ohsawa et al. |
| 2011/0091152 A1 | 4/2011 | Nishio |

FOREIGN PATENT DOCUMENTS

| | | |
|---|---|---|
| JP | 9-281536 | 10/1997 |
| JP | 2002-250949 | 9/2002 |
| JP | 2003-215368 A | 7/2003 |
| JP | 2004-35838 | 2/2004 |
| JP | 2006-185548 | 7/2006 |
| JP | 2007-052918 | 3/2007 |
| JP | 2007-207349 | 8/2007 |
| JP | 2007-280572 | 10/2007 |
| JP | 2008-130106 | 6/2008 |
| JP | 2008-152899 A | 7/2008 |
| JP | 2009-176354 A | 8/2009 |
| JP | 2011-86353 A | 4/2011 |
| WO | WO 2007/133036 A1 | 11/2007 |

*Primary Examiner* — Jerry Rahll (74) *Attorney, Agent, or Firm* — Jean C. Edwards, Esq.; Edwards Neils PLLC (57) ABSTRACT

A suspension board with circuit includes a circuit board including a metal supporting board, an insulating layer formed on the metal supporting board, a conductive layer formed on the insulating layer, and an optical waveguide disposed on the circuit board. The optical waveguide includes an under clad layer, a core layer formed on the under clad layer, and an over clad layer formed on the core layer and included in the core layer when projected in the thickness direction of the core layer. The optical waveguide is provided with a positioning portion to position the optical waveguide and a near-field light generating unit for generating near-field light by a light emitted from the optical waveguide, and a protective layer to cover the positioning portion.

7 Claims, 10 Drawing Sheets

SUSPENSION BOARD WITH CIRCUIT

CROSS-REFERENCE TO RELATED APPLICATIONS

This patent application claims priority from Japanese Patent Application No. 2009-269158, filed on Nov. 26, 2009, the contents of which are herein incorporated by reference in their entirety.

BACKGROUND OF THE INVENTION

1. Field of the Invention

The present invention relates to a suspension board with circuit. More particularly, the present invention relates to a suspension board with circuit mounted on a hard disk drive or the like which adopts an optical assist system.

2. Description of Related Art

Conventionally, an optical assist system (an optical assist magnetic recording system) has been known as a magnetic recording system for a hard disk drive or the like that is capable of recording information at high density in a small recording magnetic field by heating a hard disk drive under irradiation of near-field light during recording of information, and then recording the information with a magnetic head in a state where the coercive force of the hard disk drive is reduced.

There has been proposed that, for example, in an optical assist magnetic recording device which adopts an optical assist system, a heat-assisted magnetic recording head including a suspension and an optical waveguide (secondary optical waveguide) provided thereon is supported by a floating slider (cf. for example, Japanese Unexamined Patent Publication No. 2006-185548).

An optical waveguide (first optical waveguide) which is different from a secondary optical waveguide and a near-field light generating unit disposed thereunder are provided on the floating slider. By arranging an end portion of the secondary optical waveguide in opposed relation to the upper end portion of the first optical waveguide, light transmitted through the secondary optical waveguide passes through the first optical waveguide and is applied to the near-field light generating unit, thereby heating a hard disk drive.

SUMMARY OF THE INVENTION

However, in the heat-assisted magnetic recording head described in Japanese Unexamined Patent Publication No. 2006-185548, when the secondary optical waveguide and the first optical waveguide cannot be arranged accurately, irradiation of light from the secondary optical waveguide to the near-field light generating unit via the first optical waveguide is insufficient. Therefore, heating the hard disk drive by the near-filed light generating unit is insufficient, which leads to the problem that information cannot be recorded at high density on the hard disk drive.

On the other hand, when handling or positioning the secondary optical waveguide, the secondary optical waveguide might be damaged by contact with the outside or the first optical waveguide.

It is an object of the present invention to provide a suspension board with circuit where an optical waveguide and a near-field light generating unit are positioned more accurately so as to apply light transmitted through the optical waveguide to the near-field light generating unit more surely.

The suspension board with circuit of the present invention includes a circuit board including a metal supporting board, an insulating layer formed on the metal supporting board, and a conductive layer formed on the insulating layer; and an optical waveguide disposed on the circuit board, wherein the optical waveguide includes an under clad layer, a core layer formed on the under clad layer, and an over clad layer formed on the core layer and included in the core layer when projected in the thickness direction of the core layer, and wherein the optical waveguide is provided with a positioning portion to position the optical waveguide and a near-field light generating unit for generating near-field light by a light emitted from the optical waveguide, and a protective layer to cover the positioning portion.

According to the suspension board with circuit, the optical waveguide and the near-field light generating unit can be positioned accurately by the positioning portion.

In the core layer, when applying light to the opposite portion to the lower side of the over clad layer, a path which can transmit such light is formed along the over clad layer.

Therefore, light transmitted through the optical waveguide can be surely applied to the near-field light generating unit, and a hard disk drive can be sufficiently heated.

As a result, information can be recorded on the hard disk drive at high density and an optical assist system can be conducted surely.

Further, since the positioning portion is covered by the protective layer, it is possible to prevent contact between the outside and the positioning portion when handling the optical waveguide, and to prevent damage of the positioning portion caused by contact between a head slider and the positioning portion on positioning. Therefore, the optical waveguide and the near-field light generating unit can be positioned more accurately.

As a result, information can be recorded on the hard disk drive at higher density and the optical assist system can be conducted more surely.

In the suspension board with circuit of the present invention, it is preferable that the protective layer is made of a transparent material.

In the suspension board with circuit, a high level of visibility of the positioning portion from above can be ensured.

Further, in the suspension board with circuit of the present invention, it is preferable that the protective layer covers the over clad layer.

In the suspension board with circuit, since the over clad layer is covered by the protective layer, it is possible to prevent contact between the outside and the over clad layer when handling the optical waveguide, and to prevent damage of the over clad layer caused by contact between the head slider and the over clad layer on positioning. Therefore, excellent optical connection reliability in the optical waveguide can be ensured.

Further, in the suspension board with circuit of the present invention, it is preferable that the positioning portion is disposed to be spaced apart from the over clad layer.

In the suspension board with circuit, since the positioning portion is disposed to be spaced apart from the over clad layer, a displacement of the relative position of the path with respect to the positioning portion can be easily recognized.

Therefore, the path and the near-field light generating unit can be positioned more accurately.

In the suspension board with circuit of the present invention, it is preferable that the over clad layer extends in a lengthwise direction and a width thereof in the direction perpendicular to the lengthwise direction is 10 μm or less.

In the suspension board with circuit, since the width of the over clad layer is within a specific range, the path can form into the single-mode distribution. Therefore, light transmitted through the optical waveguide, as single-mode light, can be applied to the near-field light generating unit surely and efficiently, and the hard disk drive can be heated surely and efficiently.

As a result, the optical assist system can be conducted surely and efficiently.

In the suspension board with circuit of the present invention, it is preferable that the near-field light generating unit is provided in a head slider provided with a magnetic head.

In the suspension board with circuit, the head slider is provided with the near-field light generating unit and the magnetic head. Therefore, the optical assist system can be conducted surely.

DETAILED DESCRIPTION OF THE INVENTION

Figure 1:
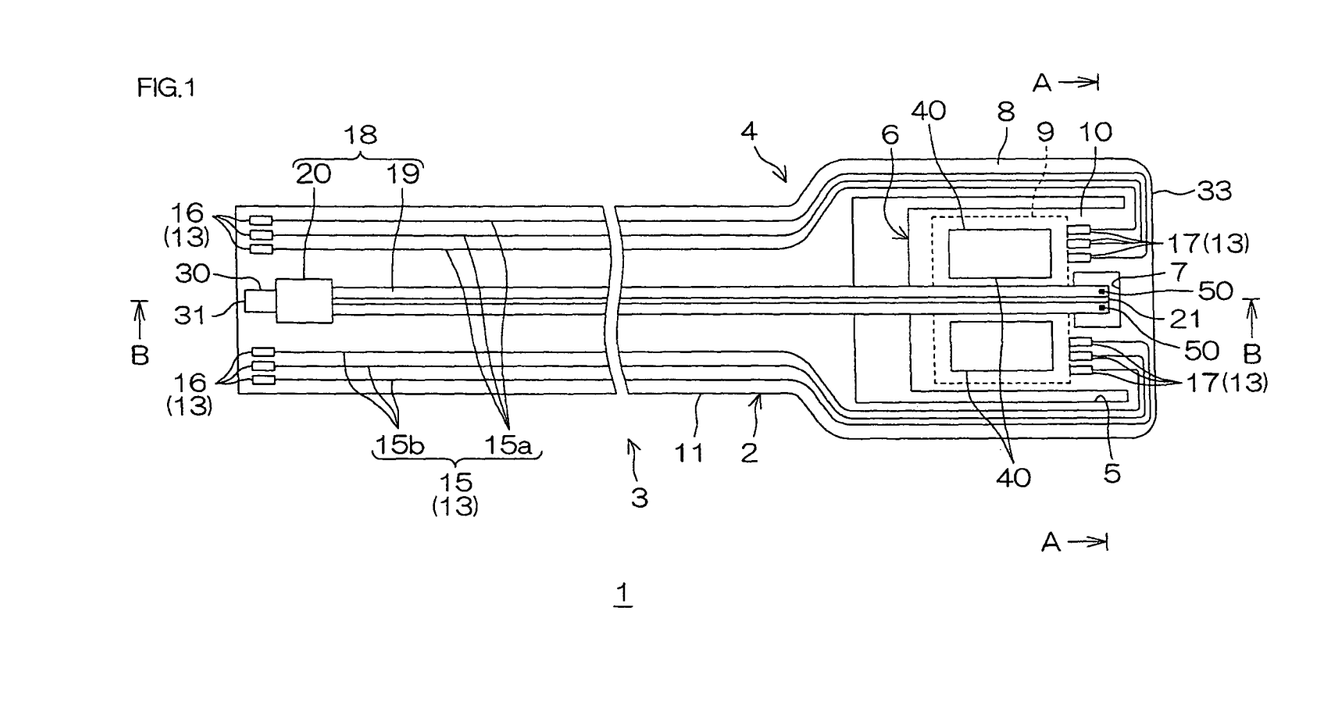
FIG. 1 is a plane view illustrating a suspension board with circuit of an embodiment according to the present invention.
Figure 2:
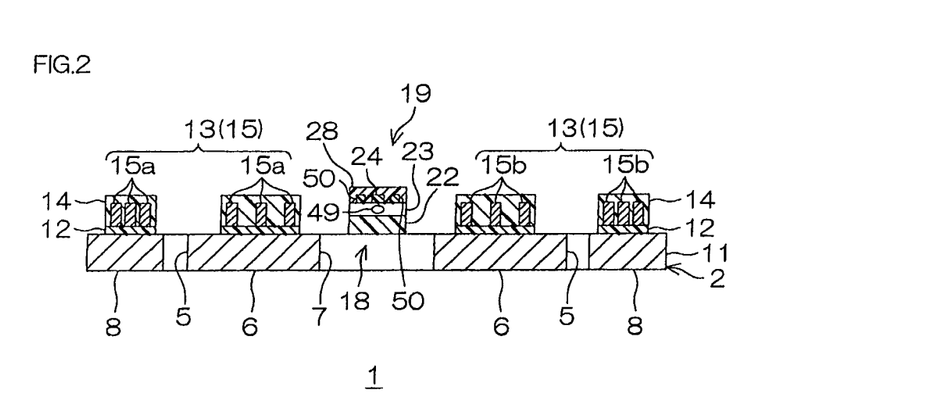
FIG. 2 is a sectional view taken along the widthwise direction of the suspension board with circuit shown in FIG. 1 and a sectional view taken along the line A-A in FIG. 1.
Figure 3:
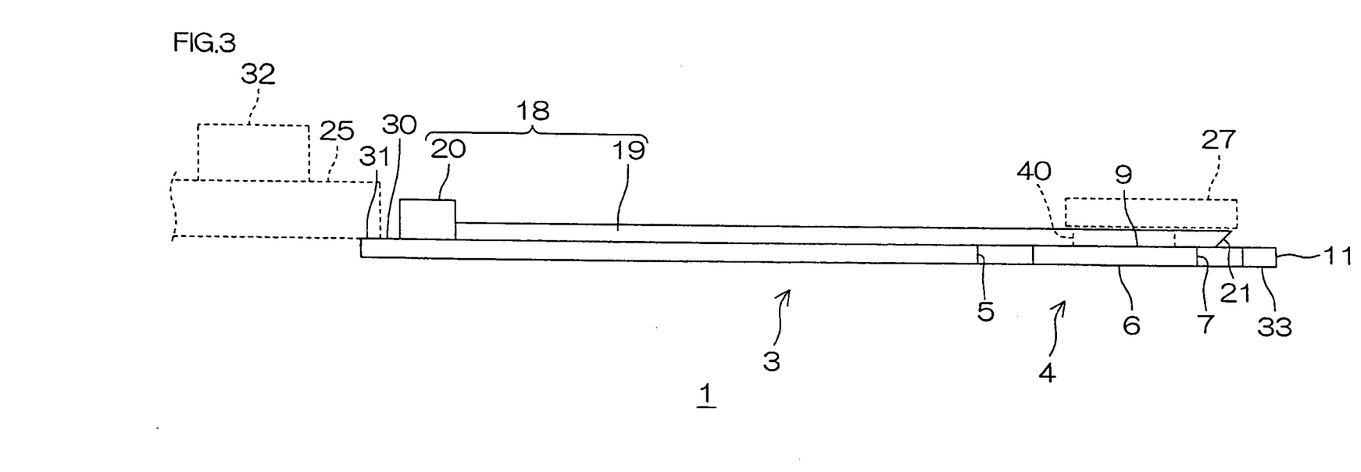
FIG. 3 is a sectional view taken along the lengthwise direction of the suspension board with circuit shown in FIG. 1 and a sectional view taken along the line B-B in FIG. 1.
Figure 4:
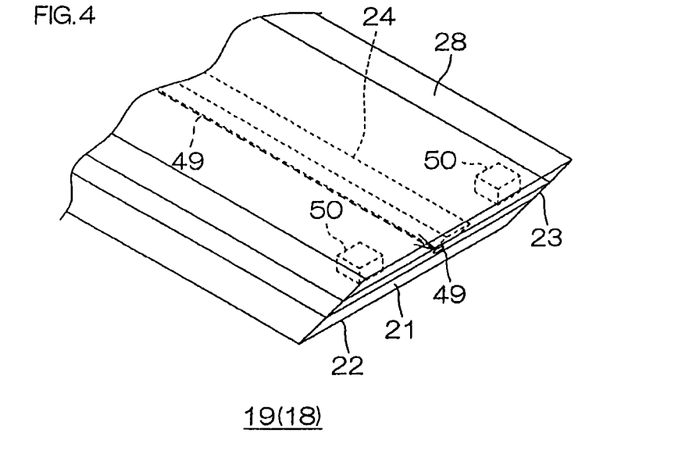
FIG. 4 is an enlarged perspective view of a front end portion of an optical waveguide in the suspension board with circuit shown in FIG. 1.
Figure 5:
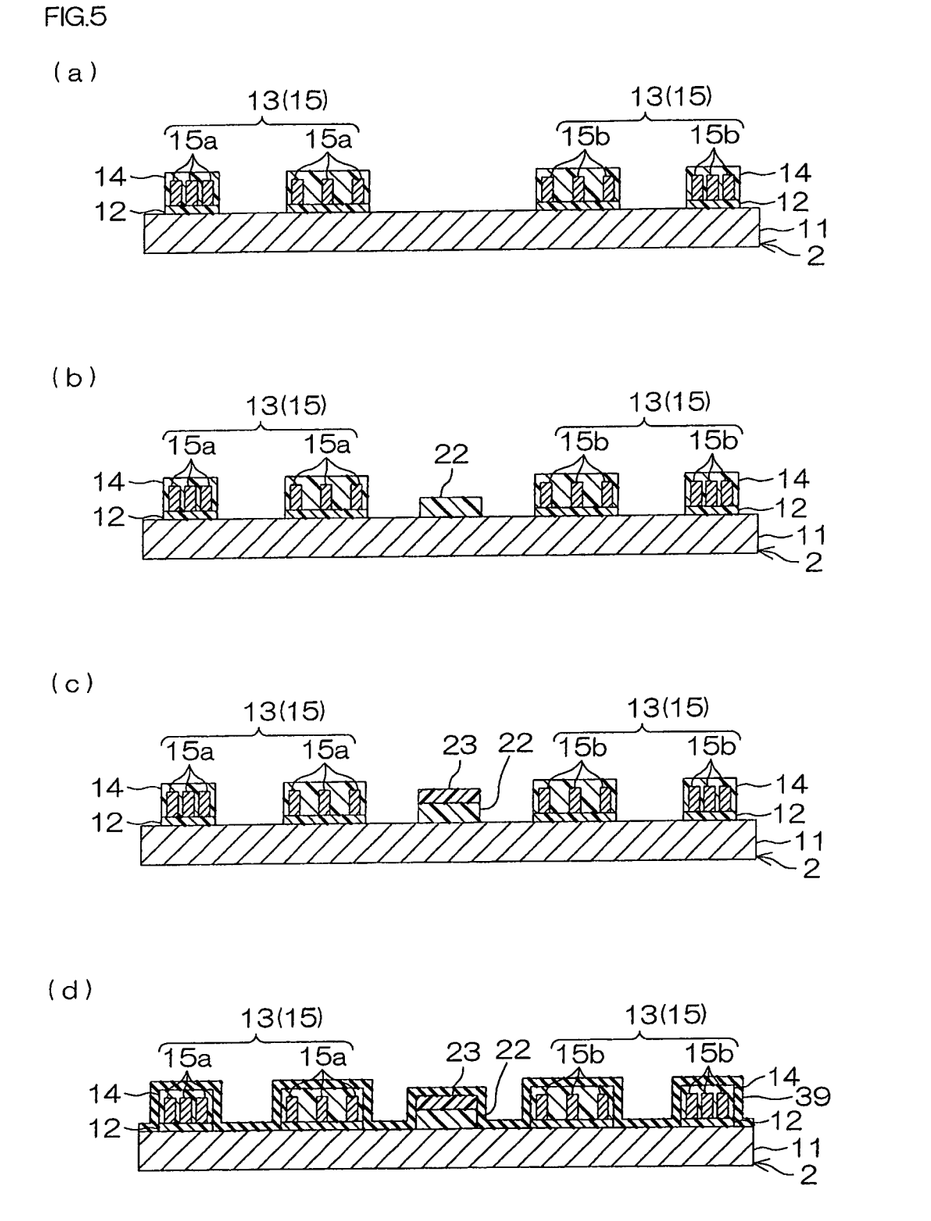
FIG. 5 is a sectional view for explaining a method for producing the suspension board with circuit shown in FIG. 2;
  (a) shows a step of preparing a circuit board,
  (b) shows a step of forming an under clad layer,
  (c) shows a step of forming a core layer,
  (d) shows a step of forming a photosensitive film.
Figure 6:
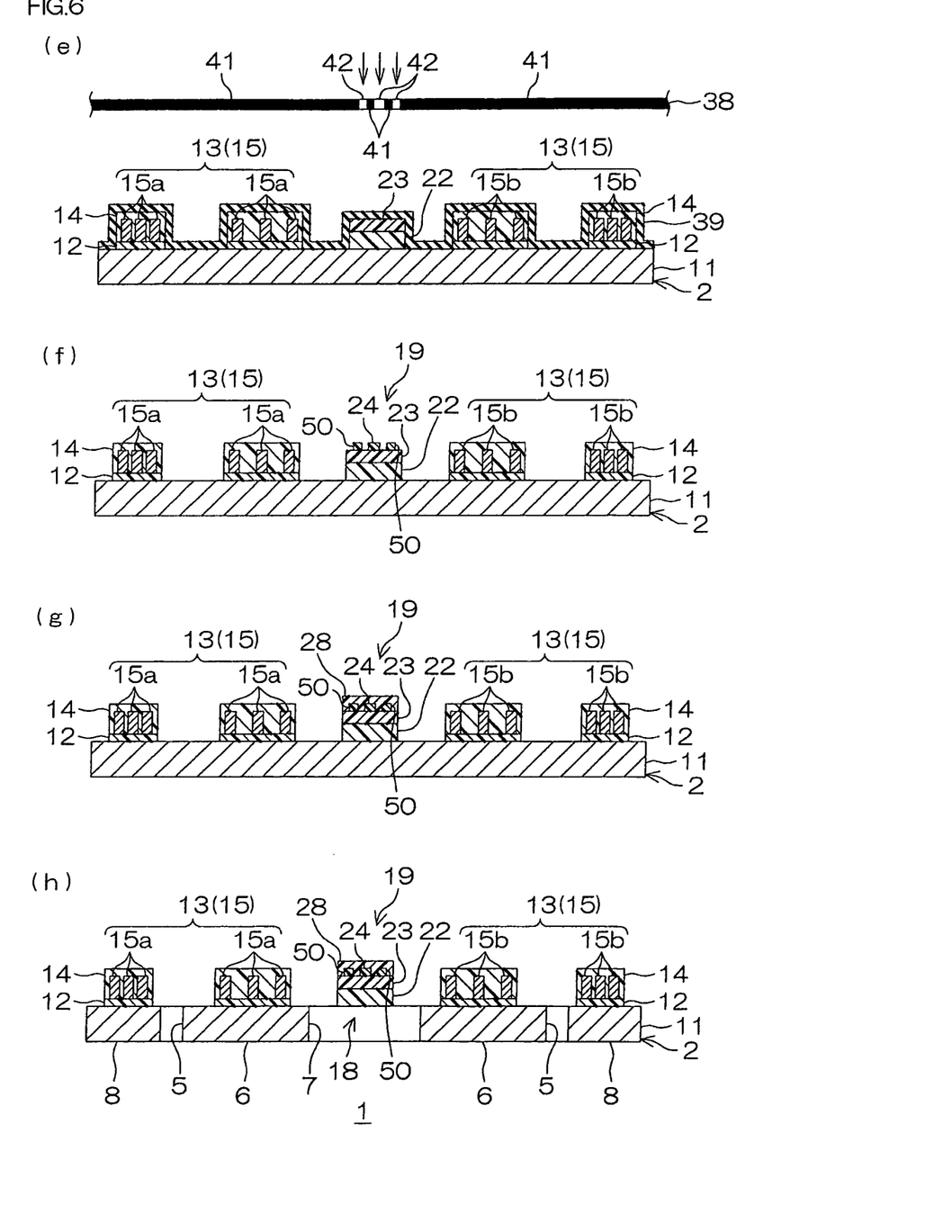
FIG. 6 is a sectional view for explaining, following FIG. 5, the method for producing the suspension board with circuit shown in FIG. 2;
  (e) shows a step of exposing a film via a photomask,
  (f) shows a step of developing a film to form an over clad layer,
  (g) shows a step of forming a protective layer,
  (h) shows a step of forming an opening portion and a slit.
Figure 7:
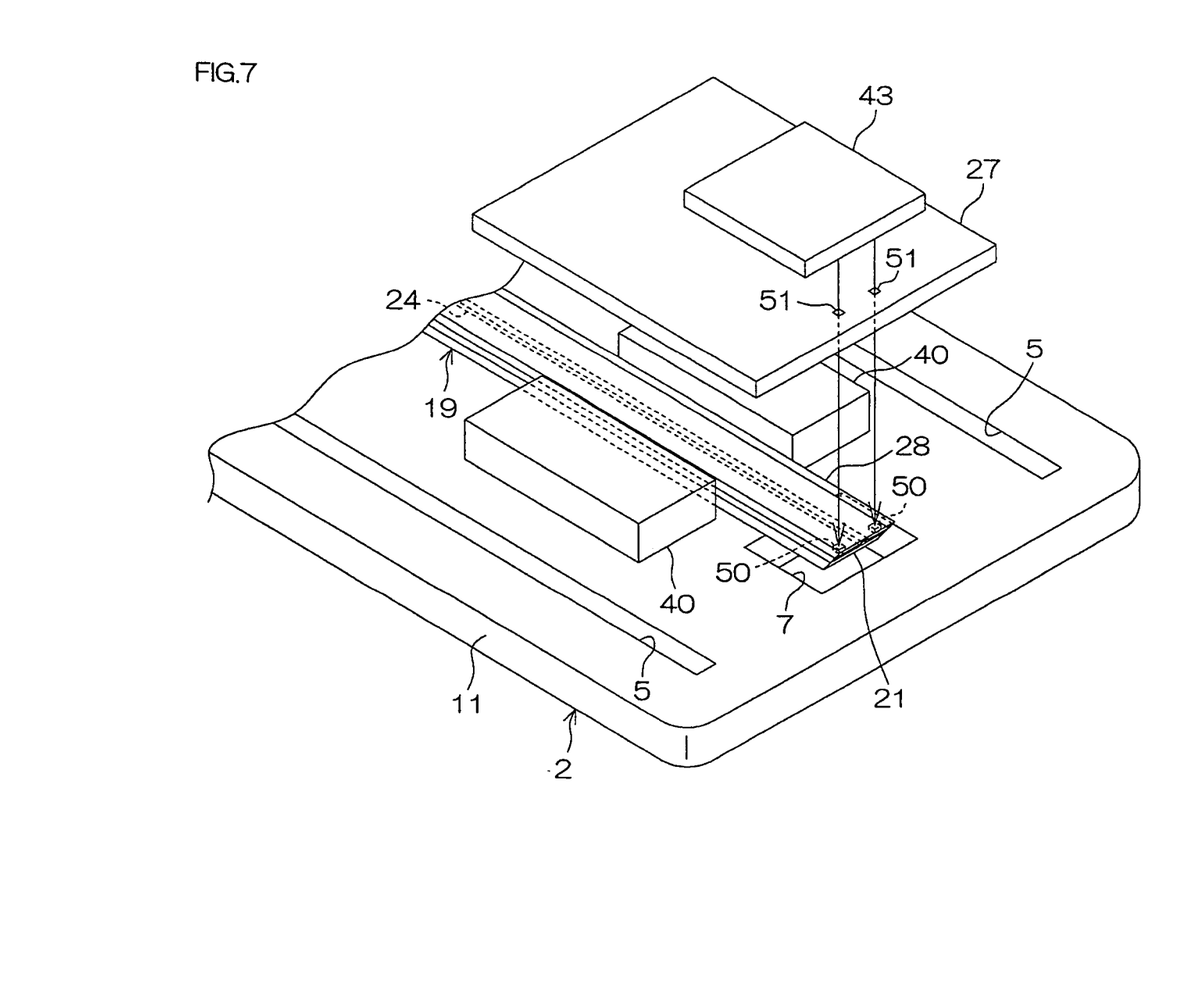
FIG. 7 is a perspective view for explaining a positioning of a head slider with respect to an optical waveguide.
Figure 8:
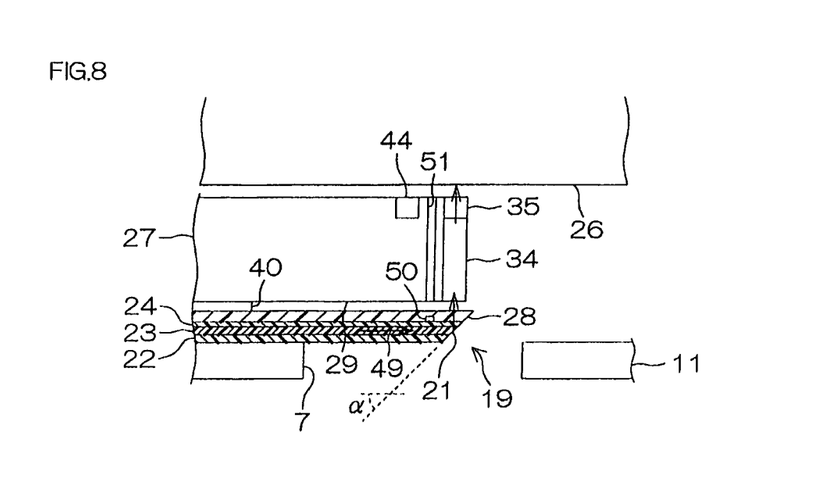
FIG. 8 is a sectional view of a suspension board with circuit in a state that a head slider is positioned.

FIG. 1 is a plane view illustrating a suspension board with circuit of an embodiment according to the present invention, FIG. 2 is a sectional view taken along the widthwise direction (direction perpendicular to the lengthwise direction) of the suspension board with circuit shown in FIG. 1 and a sectional view taken along the line A-A in FIG. 1, FIG. 3 is a sectional view taken along the lengthwise direction of the suspension board with circuit shown in FIG. 1 and a sectional view taken along the line B-B in FIG. 1, FIG. 4 is an enlarged perspective view of a front end portion of an optical waveguide in the suspension board with circuit shown in FIG. 1, FIG. 5 and FIG. 6 are sectional views for explaining a method for producing the suspension board with circuit shown in FIG. 2, FIG. 7 is a perspective view for explaining a positioning of a head slider with respect to a suspension board with circuit, and FIG. 8 is a sectional view of a suspension board with circuit in a state that a head slider is positioned.

In FIG. 1 and FIG. 3, to clarify a relative position of a conductive pattern 13 and an optical waveguide 19 described later, an insulating base layer 12 and an insulating cover layer 14 described later are omitted. Further, in FIG. 7, to clarify a relative position of the optical waveguide 19, the conductive pattern 13 is omitted.

In FIG. 1, a suspension board with circuit 1 includes a circuit board 2 and an optical assist portion 18 provided on the circuit board 2.

In the circuit board 2, a metal supporting board 11 provided with a magnetic head 44 (cf. FIG. 8) in a hard disk drive and to support the magnetic head 44 while keeping a minute gap between the magnetic head 44 and a hard disk drive 26 (cf. FIG. 8) against an airflow caused when the magnetic head 44 and the hard disk drive 26 travel relatively to each other is integrally formed with the conductive pattern 13 to connect an external circuit board 25 (e.g., read/write board; cf. dotted line in FIG. 3) and the magnetic head 44.

The circuit board 2 is formed corresponding to the outer shape of the suspension board with circuit 1 and formed in the shape of a flat belt extending in a lengthwise direction. The circuit board 2 integrally includes a wire portion 3 arranged on one side in the lengthwise direction (hereinafter referred to as the rear side) and a gimbal 4 arranged on the other side of the wire portion 3 in the lengthwise direction (hereinafter referred to as the front side).

The wire portion 3 is formed in a generally rectangular shape in plane view extending in the lengthwise direction.

The gimbal 4 is continuously formed from the front end of the wire portion 3, while having a generally rectangular shape in plane view expanding toward both widthwise outer sides with respect to the wire portion 3. The gimbal 4 is also formed with a slit 5 having a generally U-shape opening toward the front side in plane view. Further, the gimbal 4 integrally includes a tongue portion 6 sandwiched by the slit 5 in the widthwise direction, an outrigger portion 8 arranged on both widthwise outer sides of the slit 5, and a returning wire portion 33 arranged on the front side of the tongue portion 6 and the outrigger portion 8.

The tongue portion 6 is formed in a generally rectangular shape in plane view and includes a mounting portion 9 and a terminal forming portion 10.

The mounting portion 9 is a region for mounting a head slider 27 (region in dotted line in FIG. 1), arranged in the rear side and middle of the tongue portion 6 in the lengthwise direction in plane view and formed in a generally rectangular shape in plane view. Further, the mounting portion 9 is provided with pedestals 40.

The pedestals 40 are provided in order to support the head slider 27 (cf. FIG. 8) and a plurality (two pieces) of the pedestals 40 are disposed substantially over the lengthwise direction of the mounting portion 9 and disposed to be spaced apart from each other so that an optical waveguide 19 described later can be provided therebetween in the widthwise direction. Each pedestal 40 is formed in a generally rectangular shape in plane view extending in the lengthwise direction.

The terminal forming portion 10 is a region in which head-side terminals 17 described later are formed, and a region formed in a generally rectangular shape in plane view extending along the widthwise direction, and arranged on the front side of the mounting portion 9. Further, the terminal forming portion 10 is formed with an opening portion 7.

The opening portion 7 is formed in a generally rectangular shape in plane view so as to penetrate the metal supporting board 11 in the thickness direction and formed in the middle of the terminal forming portion 10 in the widthwise direction.

The conductive pattern 13 integrally and continuously includes external terminals 16, head-side terminals 17, and signal wires 15 for connecting the external terminals 16 and head-side terminals 17.

A plurality (six pieces) of the signal wires 15 are provided along the lengthwise direction of the circuit board 2, and each signal wire 15 is arranged in parallel at spaced intervals to each other in the widthwise direction.

The plurality of the signal wires 15 are provided with three pieces of one wire 15a arranged on one side in the widthwise direction and three pieces of the other wire 15b arranged on the other side in the widthwise direction. The signal wires 15 are arranged to extend along the lengthwise direction in the wire portion 3, then extend along the outrigger portion 8 in the gimbal 4, and reach the returning wire portion 33, then extend inward in the widthwise direction, yet turn back toward the rear side, and finally to reach the front end portion of the head-side terminals 17 in the terminal forming portion 10.

A plurality (six pieces) of the external terminals 16 are provided in the rear end portion of the wire portion 3, and arranged so as to be each connected with the rear end portion of each of the signal wires 15. Further, the external terminals 16 are disposed to be spaced apart from each other in the widthwise direction. Terminals of an external circuit board 25 (dotted line in FIG. 3) are to be connected to the external terminals 16.

The head-side terminals 17 are arranged in the gimbal 4, and more specifically, arranged in the terminal forming portion 10 of the tongue portion 6. A plurality (six pieces) of the head-side terminals 17 are provided so as to be each connected with the front end portion of each of the signal wires 15.

More specifically, the head-side terminals 17 are disposed to be spaced apart from each other in the widthwise direction along the rear end edge of the terminal forming portion 10 (the front end edge of the mounting portion 9). Terminals of the magnetic head 44 (FIG. 8) are to be connected to the head-side terminals 17.

As shown in FIG. 2, the circuit board 2 includes the metal supporting board 11, the insulating base layer 12 formed on the metal supporting board 11, the conductive pattern 13, as a conductive layer, formed on the insulating base layer 12, and an insulating cover layer 14 formed on the insulating base layer 12 so as to cover the conductive pattern 13.

As shown in FIG. 1 to FIG. 3, the metal supporting board 11 is formed corresponding to the outer shape of the circuit board 2.

The insulating base layer 12 is formed on the upper surface of the metal supporting board 11 so as to correspond to a position where the conductive pattern 13 in the wire portion 3 and the gimbal 4 is formed. Further, the insulating base layer 12 is arranged on the upper surface of the metal supporting board 11 so that a region for forming the optical waveguide 19 described later may be allocated. The insulating base layer 12 is formed in the wire portion 3 so as to correspond to a position where a supplying wire 30 and a supplying terminal 31 are formed.

The conductive pattern 13 is arranged over the wire portion 3 and the gimbal 4, and arranged so as to be included in the insulating base layer 12 when projected in the thickness direction. Further, the conductive pattern 13 is formed on the upper surface of the insulating base layer 12 as a wired circuit pattern in which the external terminals 16, the head-side terminals 17, and the signal wires 15 are included integrally and continuously.

The insulating cover layer 14 is arranged over the wire portion 3 and the gimbal 4, and is arranged on the upper surface of the insulating base layer 12 so as to correspond to a position where the signal wires 15 are formed. Further, the insulating cover layer 14 is formed so as to expose the external terminals 16 and the head-side terminals 17, and to cover the signal wires 15.

The optical assist portion 18 includes the optical waveguide 19 (first optical waveguide) and a light emitting device 20.

The optical waveguide 19 is disposed on the circuit board 2 and is arranged over the wire portion 3 and the gimbal 4 at spaced intervals to the signal wires 15. Specifically, on the upper surface of the metal supporting board 11, the optical waveguide 19 is arranged in the widthwise center position of the metal supporting board 11 and is formed in a linear shape in plane view extending along the lengthwise direction. Further, the optical waveguide 19 is arranged between one wire 15a and the other wire 15b so as to extend in parallel to these wires.

Further, the optical waveguide 19 is arranged so as to orthogonally traverse the slit 5 from the front end portion of the wire portion 3, to pass through between the two pedestals 40, and then to let the front end face 21 of the optical waveguide 19 face the opening portion 7.

Further, the optical waveguide 19 has a strip loading structure and, as shown in FIG. 2 and FIG. 4, includes an under clad layer 22, a core layer 23 formed on the under clad layer 22, and an over clad layer 24 which is formed on the core layer 23 and included in the core layer 23 when projected in the thickness direction of the core layer 23.

The under clad layer 22 is formed on the upper surface of the metal supporting board 11 corresponding to the outer shape of the optical waveguide 19, and formed in the shape of a flat belt extending in the lengthwise direction.

The core layer 23 is formed over the entire upper surface of the under clad layer 22, and is formed so that both widthwise end edges of the core layer 23 are in the same positions in plane view as those of the under clad layer 22.

The over clad layer 24 extends in the lengthwise direction and is formed narrower than the core layer 23 on the upper surface of the core layer 23. More specifically, the over clad layer 24 is arranged on the center of the core layer 23 in the widthwise direction, and is formed so as to expose both widthwise end portions of the core layer 23.

In the core layer 23, in the opposite portion to the lower side of the over clad layer 24, a path 49 which transmits light along the over clad layer 24 is formed when the light is applied therein.

As shown in FIG. 4 and FIG. 8, the front end portion of the optical waveguide 19 is formed into obliquely cutting shape. Specifically, the front end face 21 is formed, for example, so as to intersect the lengthwise direction of the optical waveguide 19 at a predetermined angle (tilt angle) α. Thus, the optical waveguide 19 is formed so that the end face 21 forms a mirror face having a tilt angle α, and therefore light transmitted through the path 49 of the optical waveguide 19 is changed in the optical path at a predetermined angle by the end face 21. The light changed in the optical path is emitted upward, specifically, to the entry of a slider-side optical waveguide 34 described later. Such a tilt angle α is not particularly limited, and, for example, in the range of 35 to 55 degrees, or preferably 40 to 50 degrees, or more specifically, 45 degrees.

As shown in FIG. 1 and FIG. 7, a portion facing the opening portion 7 (portion including the end face 21) of the optical waveguide 19 is exposed from the opening portion 7 of the metal supporting board 11.

Further, the optical waveguide 19 is provided with positioning marks 50 as a positioning portion and a protective layer 28.

As shown in FIG. 1, FIG. 2 and FIG. 4, the positioning marks 50 are a reference mark in order to position the front end face 21 of the optical waveguide 19 and the entry of the slider-side optical waveguide 34 (second optical waveguide). In the front end portion of the optical waveguide 19, a plurality (two pieces) of the positioning marks 50 are provided on both outer sides of the over clad layer 24 in the widthwise direction.

Each positioning mark 50 is formed as the same layer as the over clad layer 24 described above and, that is, formed on the upper surface of the core layer 23. Each positioning mark 50 is formed in a generally rectangular shape in plane view and is arranged at spaced intervals in both widthwise outer sides with respect to the over clad layer 24.

The protective layer 28 is formed on the core layer 23 and covers the over clad layer 24 and positioning marks 50. The protective layer 28 is formed over the entire upper surface of the core layer 23 in the lengthwise direction. Further, the protective layer 28 is formed so that both widthwise end edges thereof are in the same positions in plane view as those of the core layer 23. More specifically, the protective layer 28 covers the upper surface and both widthwise side surfaces of the over clad layer 24; the upper surface, both widthwise side surfaces and both lengthwise side surfaces of the positioning portion 50; and the upper surface of the core layer 23 exposed from the over clad layer 24 and the positioning marks 50.

As shown in FIG. 1 and FIG. 3, the light emitting device 20 is a light source for applying light to the optical waveguide 19 and, for example, converts electric energy into light energy and applies the high-energy light to the optical waveguide 19. The light emitting device 20 is arranged on the rear end portion of the circuit board 2, more specifically, on the widthwise middle position in the rear end portion of the wire portion 3, and is arranged between one wire 15a and the other wire 15b at spaced intervals thereto. Further, the light emitting device 20 is connected with the rear end portion of the optical waveguide 19 so as to emit light to the path 49 of the core layer 23 in the optical waveguide 19.

Further, the light emitting device 20 is connected with the supplying wire 30 in order to supply the light emitting device 20 with electric energy, and the supplying terminal 31 is formed in the rear end of the supplying wire 30 so as to connect with terminals of the eternal circuit board 25 (dotted line in FIG. 3). Both the supplying wire 30 and the supplying terminal 31 are formed on the insulating base layer 12, and the supplying wire 30 is covered by the insulating cover layer 14 and the supplying terminal 31 is exposed from the insulating cover layer 14.

In the optical assist portion 18, the electric energy supplied from the external circuit board 25 via the supplying terminal 31 and the supplying wire 30 is converted into light energy in the light emitting device 20, and the resulting light is emitted to the optical waveguide 19. The light thus emitted is transmitted through the optical waveguide 19 and is reflected in the front end face 21 of the optical waveguide 19 and the reflected light is applied to the slider-side optical waveguide 34 (cf. FIG. 8) of the head slider 27.

Next, a method for producing the suspension board with circuit 1 is described with reference to FIG. 5 and FIG. 6.

In this method, the circuit board 2 is first prepared, as shown in FIG. 5(a). In the circuit board 2, an insulating base layer 12, a conductive pattern 13 and an insulating cover layer 14 are sequentially laminated on a metal supporting board 11.

To prepare the circuit board 2, the metal supporting board 11 is first prepared.

The metal supporting board 11 is formed from a metal material, such as stainless steel, 42-alloy, aluminum, beryllium copper, and phosphor bronze or the like. The metal supporting board 11 has a thickness in the range of, for example, 15 to 30 µm, or preferably 20 to 25 µm. Then, the insulating base layer 12 is formed on the metal supporting board 11.

As an insulating material for forming the insulating base layer 12, for example, synthetic resin such as polyimide resin, polyamide-imide resin, acrylic resin, polyether nitrile resin, polyether sulfone resin, polyethylene terephthalate resin, polyethylene naphthalate resin, and polyvinyl chloride resin is used. Among them, polyimide resin is preferably used.

To form the insulating base layer 12, for example, a photosensitive varnish of the above-mentioned insulating material is applied to the upper surface of the metal supporting board 11 and then dried. The dried varnish is exposed to light via a photomask and is then cured as required after development.

The insulating base layer 12 thus formed has a thickness in the range of, for example, 1 to 35 µm, or preferably 8 to 15 µm.

Then, the conductive pattern 13 is formed on the insulating base layer 12.

As a conductive material for forming the conductive pattern 13, for example, copper, nickel, gold, solder, and alloys thereof are used.

To form the conductive pattern 13, a known patterning method, such as an additive method and a subtractive method is used.

The conductive pattern 13 thus formed has a thickness in the range of, for example, 3 to 50 µm, or preferably 5 to 20 µm. Each signal wire 15 has a width in the range of, for example, 10 to 200 µm, or preferably 20 to 100 µm and the spacing between signal wires 15 is in the range of, for example, 10 to 1000 µm, or preferably 20 to 100 µm. Each external terminal 16 and each head-side terminal 17 has a width in the range of, for example, 20 to 1000 µm, or preferably 30 to 800 µm and the spacing between external terminals 16 and the spacing between head-side terminals 17 is in the range of, for example, 20 to 1000 µm, or preferably 30 to 800 µm.

The insulating cover layer 14 is formed from the same insulating material as that for the insulating base layer 12 described above.

To form the insulating cover layer 14, for example, a photosensitive varnish of the above-mentioned insulating material is applied to the upper surface of the metal supporting board 11 including the conductive pattern 13 and the insulating base layer 12 and then dried. The dried varnish is exposed to light via a photomask and is then cured as required after development.

The insulating cover layer 14 thus formed has a thickness in the range of, for example, 1 to 40 µm, or preferably 1 to 7 µm.

Thus, the circuit board 2 is prepared where the insulating base layer 12, the conductive pattern 13, and the insulating cover layer 14 are sequentially laminated on the metal supporting board 11.

Simultaneously with the formation of the above-mentioned conductive pattern 13, a supplying wire 30 and a supplying terminal 31 shown in FIG. 1 and FIG. 3 are formed in the same method as described above.

In this method, as shown in FIG. 5(b) to FIG. 5(d) and FIG. 6(e) to FIG. 6(g), an optical waveguide 19 is disposed on the circuit board 2.

Specifically, an under clad layer 22, a core layer 23, both of an over clad layer 24 and positioning marks 50, and a protective layer 28 are sequentially laminated on the metal supporting board 11.

To laminate sequentially the under clad layer 22, the core layer 23, both of the over clad layer 24 and the positioning marks 50, and the protective layer 28, as shown in FIG. 5(b), the under clad layer 22 is first formed on the metal supporting board 11.

As a material for forming the under clad layer 22, for example, a resin material such as polyimide resin, polyamide resin, silicone resin, epoxy resin (alicyclic epoxy resin, etc.), acrylic resin, fluorene derivative resin, or a mixed resin of fluorene derivative resin and alicyclic epoxy resin, and a mixed resin of any of these resins and an alicyclic ether compound (e.g., an oxetane compound, etc.) or the like is used. Polyimide resin is preferably used in terms of heat resistance and epoxy resin is preferably used in terms of resolution, and acrylic resin is preferably used in terms of alkaline development. These resin materials are preferably used in the form of photosensitive resins containing a photosensitizer. Preferably, a mixed resin of a photosensitive fluorene derivative resin (a photosensitive fluorene epoxy resin as raw material) and an alicyclic epoxy resin is used. The photosensitizer that may be used includes, for example, a known onium salt or the like.

To form the under clad layer 22 in the pattern described above, for example, a varnish (resin solution) of any of the above-mentioned photosensitive resins is prepared using a known diluent, and the varnish thus prepared is applied to over the entire upper surface of the metal supporting board 11 including the insulating cover layer 14 and the insulating base layer 12. Thereafter, the applied varnish is dried, and then forms a photosensitive film. Then, the film is exposed to light via a photomask, and is then developed by dissolving an unexposed portion with a known organic solvent or the like. Thereafter, the developed varnish is cured as required.

The under clad layer 22 thus formed has a refractive index in the range of, for example, 1.600 or more to less than 1.615. Further, the under clad layer 22 has a thickness in the range of, for example, 1 to 25 μm, or preferably 1 to 5 μm, and has a width in the range of, for example, 20 to 200 μm, or preferably 30 to 100 μm.

Subsequently, as shown in FIG. 5(c), the core layer 23 is formed on the upper surface of the under clad layer 22.

As a material for forming the core layer 23, a resin material having a higher refractive index than that for the under clad layer 22 is used. The resin material that may be used includes, for example, the same resin as those mentioned above. Preferably, a mixed resin of a photosensitive fluorene derivative resin (a photosensitive fluorene epoxy resin as raw material) and an oxetane compound is used. In the resin material for the core layer 23, in order to have a higher refractive index than that for the under clad layer 22, it is possible to adopt an aromaticity group such as a phenyl group, or adopt a straight-chain aliphatic group such as a methyl group and an ethyl group, or/and a cyclic aliphatic group such as a norbornene group or the like.

To form the core layer 23 in the pattern described above, for example, a varnish (resin solution) of any of the above-mentioned photosensitive resins is prepared using a known diluent, and the varnish thus prepared is applied to the upper surface of the metal supporting board 11 including the under clad layer 22. Thereafter, the applied varnish is dried, and then forms a photosensitive film. Then, the film is exposed to light via a photomask, and is then developed by dissolving an unexposed portion with a known organic solvent or the like. Thereafter, the developed varnish is cured as required.

The refractive index of the core layer 23 thus formed is set to be higher than that of the under clad layer 22, and specifically the refractive index of the core layer 23 is set to be higher than the refractive index of the under clad layer 22 by, for example, 0.001 to 0.01 for the reason that the path 49 of the core layer 23 forms into the single-mode distribution. The refractive index of the core layer 23 is in the range of, for example, 1.615 or more to 1.65 or less. Further, the core layer 23 has a thickness in the range of, for example, 1 to 20 μm, or preferably 1 to 10 μm.

Subsequently, as shown in FIG. 5(d), FIG. 6(e) and FIG. 6(f), the over clad layer 24 is formed on the upper surface of the core layer 23 so as to be included in the core layer 23 when projected in the thickness direction. Further, the positioning marks 50 are simultaneously formed on the upper surface of the core layer 23 in the above-mentioned pattern.

As a material for forming the over clad layer 24 and the positioning marks 50, the same resin material as that for the under clad layer 22 described above is used.

To form the over clad layer 24 and the positioning marks 50 in the pattern described above, for example, as shown in FIG. 5(d), a varnish (resin solution) of any of the above-mentioned resins is first prepared using a known diluent, and the varnish thus prepared is applied to the upper surface of the metal supporting board 11 including the core layer 23. Thereafter, the applied varnish is dried, so that a photosensitive film 39 is formed on the core layer 23, on the insulating cover layer 14, and on the metal supporting board 11 exposed from the core layer 23 and the insulating cover layer 14.

Subsequently, as shown in FIG. 6(e), the film 39 is exposed to light via a photomask 38.

The photomask 38 is provided with a mask pattern composed of a light-shielding portion 41 and a light-transmitting portion 42. Further, the photomask 38 is arranged on the upper part of the film 39 and the light-transmitting portion 42 is arranged in opposed relation to the portion for forming the over clad layer 24 and the positioning marks 50, and the light-shielding portion 41 is arranged in opposed relation to the other portions. Thereafter, the film 39 is exposed to light from above via the photomask 38.

Thereafter, as shown in FIG. 6(f), with a known organic solvent or alkaline aqueous solution or the like, by dissolving a portion opposed to the light-shielding portion 41, that is, an unexposed portion, the film is developed. Thereafter, the developed film is cured as required. Thus, the over clad layer 24 and the positioning marks 50 are formed simultaneously in the above-mentioned pattern.

The refractive index of the over clad layer 24 and the positioning marks 50 thus formed is set to be lower than that of the core layer 23, and is set to be, for example, the same refractive index as that of the under clad layer 22.

Further, the over clad layer 24 and the positioning marks 50 have a thickness in the range of, for example, 1 to 20 μm, or preferably 1 to 10 μm.

The over clad layer 24 has a width in the range of, for example, 10 μm or less, or preferably 7 μm or less, and usually, for example, 1 μm or more, or preferably 3 μm or more. When a width of the over clad layer 24 is within the above-mentioned range, the path 49 can form into the single-mode distribution.

Further, the positioning marks 50 have a width and a length (length in the lengthwise direction) in the range of, for example, 10 to 100 μm, or preferably 20 to 40 μm.

Thereafter, as shown in FIG. 6(*g*), the protective layer 28 is formed on the core layer 23 so as to cover the over clad layer 24 and the positioning marks 50.

As a material for forming the protective layer 28, for example, a transparent material is used. As a transparent material, for example, an organic transparent material and an inorganic transparent material or the like are listed.

An organic transparent material is a transparent resin and, for example, the same resin material as that for the under clad layer 22 described above is used. Further, as a transparent resin, other than the resin materials described above, cellulose resin such as cellulose diacetate and cellulose triacetate, styrene resin such as polystyrene and acrylonitrile/styrene copolymer (AS resin), polycarbonate resin, polyethylene, polypropylene, polyolefin resin having cyclo structure and norbornene structure, and copolymer resin of these, polyether nitrile resin, polyether ether ketone resin, polyether sulfone resin, polyphenylene sulfide resin, vinyl alcohol resin, polyvinyl chloride resin, vinylidene chloride resin, polyvinyl butyral resin, polyarylate resin, polyoxymethylene resin or the like is used.

An inorganic transparent material is an inorganic glass and, for example, a silica glass, a multicomponent glass or the like is used.

A transparent material can be used alone or used in combination with more than two kinds. In the case where each material is used in combination with more than two kinds, for example, composite transparent material of organic transparent material and inorganic transparent material or the like is used.

As a transparent material, preferably, an organic transparent material is used. An organic transparent material is more flexible than an inorganic transparent material and a high degree of freedom and an excellent handling for the optical waveguide 19 can be ensured.

Further, as an organic transparent material, polyimide resin, epoxy resin or acrylic resin is preferably used in terms of transparency.

Further, such an organic transparent material is preferably used in the form of photosensitive transparent resin containing a photosensitizer.

To form the protective layer 28 in the pattern described above, for example, a varnish (resin solution) of any of the above-mentioned photosensitive transparent resins is prepared using a known diluent, and the varnish thus prepared is applied to the upper surface of the core layer 23 including the over clad layer 24 and the positioning marks 50, and of the metal supporting board 11. Thereafter, the applied varnish is dried, and then forms a photosensitive transparent film. Then, the transparent film is exposed to light via a photomask, and is then developed by dissolving an unexposed portion with a known organic solvent or the like. Thereafter, the developed film is cured as required.

The protective layer 28 thus formed has a total light transmittance in the range of, for example, 90% or more, or preferably 95% or more, or more preferably 99% or more, and usually less than 100%.

The total light transmittance is the ratio of the transmitted light to the incident light when light entering from the outside (incident light) transmits the protective layer 28, and is shown in the following equation (1).

$$\text{The total light transmittance(\%)} = (\text{amount of transmitted light})/(\text{amount of incident light}) \times 100 \quad (1)$$

Further, the haze (transparency) of the protective layer 28 is in the range of, for example, 1% or less, or preferably 0.5% or less, or more preferably 0.1% or less, and usually exceeds 0%.

The haze value is the ratio of the scattered light to the transmitted light when the transmitted light entering from the outside transmits the protective layer 28 and scatters, and is shown in the following equation (2).

$$\text{The haze value(\%)} = (\text{amount of scattered light})/(\text{total amount of transmitted light}) \times 100 \quad (2)$$

The haze value is determined by haze meter with reference to JIS K7361-1.

When the total light transmittance and/or the haze value of the protective layer 28 is within the above-mentioned range, the protective layer 28 with greater transparency can be obtained and a high level of visibility on confirming the positioning marks 50 visually via the protective layer 28 from above can be ensured.

Further, the refractive index of the protective layer 28 is set to be lower than that of the over clad layer 24 and the positioning marks 50, and is preferably set to be lower than any of those of the core layer 23, the over clad layer 24, and the positioning marks 50.

Specifically, the refractive index of the protective layer 28 is set to be lower than that of the over clad layer 24 and the positioning marks 50 by, for example, 0.04 to 0.2. Specifically, the refractive index of the protective layer 28 is in the range of, for example, less than 1.600, or preferably less than 1.550, or more preferably 1.531 or less and usually, for example, 1.000 or more, or preferably 1.25 or more.

When the refractive index of the protective layer 28 is within the above-mentioned range, a high level of visibility on confirming the positioning marks 50 visually via the protective layer 28 from above can be ensured.

The protective layer 28 has a thickness in the range of, for example, 0.5 to 50 μm, or preferably 1 to 5 μm.

Thus, the optical waveguide 19 provided with the positioning marks 50 and the protective layer 28 is provided on the metal supporting board 11.

Next, in this method, as shown in FIG. 6(*h*), an opening portion 7 is formed on the metal supporting board 11 in a terminal forming portion 10.

To form the opening portion 7, for example, a punching by a drill or the like, and, for example, etching or the like such as dry etching and wet etching or the like is used. Among them, etching is preferably used.

The opening portion 7 is formed so as to overlap the front end portion of the optical waveguide 19 in the thickness direction.

The opening portion 7 thus formed has a width and a length in the range of, for example, 50 to 500 μm, or preferably 100 to 200 μm.

Simultaneously with the formation of the opening portion 7, a slit 5 is formed.

Next, in this method, as shown in FIG. 8, the front end portion of the optical waveguide 19 is cut from the side of the opening portion 7 into an inclined shape where the front end face 21 of the optical waveguide 19 intersects the lengthwise direction by laser processing.

In laser processing, the optical waveguide 19 is cut at one time by irradiating the optical waveguide 19 with the laser light passing through the opening portion 7 from obliquely lower rear side so as to intersect the lengthwise direction at a predetermined angle.

Thereafter, in the rear end portion of the wire portion 3, the light emitting device 20 is disposed on the upper surface of the metal supporting board 11 so as to be optically connected with the rear end portion of the optical waveguide 19, and to be electrically connected with the front end portion of the supplying wire 30. Thus, the suspension board with circuit 1 is obtained.

In the suspension board with circuit 1 thus obtained, as shown in a dashed line in FIG. 3, the external terminals 16 (FIG. 1) and the supplying terminal 31 are connected with terminals of the external circuit board 25 in the wire portion 3. In the external circuit board 25, an IC 32 is provided so as to control the magnetic head 44 (FIG. 8) and the light emitting device 20, and the IC 32 is electrically connected with the external terminals 16 and the supplying terminal 31.

Next, an outline of the method for positioning a head slider 27, using the positioning marks 50, with respect to the optical waveguide 19 of the suspension board with circuit 1 with reference to FIG. 7 and FIG. 8 will be explained.

In FIG. 7, the head slider 27 is arranged above the optical waveguide 19 and pedestals 40 with spaced intervals, and a camera 43 is simultaneously arranged above the front end portion of the optical waveguide 19 so as to sandwich the head slider 27 with the optical wave guide 19.

As shown in FIG. 8, the head slider 27 integrally includes a slider body 29, a slider-side optical waveguide 34 provided on the front end portion thereof, a near-field light generating unit 35 and the magnetic head 44.

The slider-side optical waveguide 34 is provided so that light irradiated from the end face 21 of the path 49 in the optical waveguide 19 enters the near-field light generating unit 35. The slider-side optical waveguide 34 is formed along the thickness direction of the suspension board with circuit 1, and the lower edge (entry) is spaced in opposed relation to the end face 21 of the path 49 in the optical waveguide 19 in the thickness direction and the upper end (exit) is connected with the near-field light generating unit 35 to be described next.

The near-field light generating unit 35 is provided in order to produce near-field light from the light (transmitted light) emitted from the upper end of the slider-side optical waveguide 34, and to apply the near-field light to the surface of a hard disk drive 26, thereby heating a minute region on the surface of the hard disk drive 26. The near-field light generating unit 35 is disposed on the slider body 29 so as to be fixed with respect to the upper end of the slider-side optical waveguide 34. The near-field light generating unit 35 includes a metal scatterer and an aperture or the like, and a known near-field light generating device described in, for example, Japanese Unexamined Patent Publications No. 2007-280572, No. 2007-052918, No. 2007-207349 and No. 2008-130106 or the like is used.

The magnetic head 44 is provided in order to record information on a minute region on the surface of the hard disk drive 26 heated by the near-field light generating unit 35, and is located near the near-field light generating unit 35.

In the front end portion of the slider body 29, a plurality (two pieces) of the slider marks 51 arranged at spaced intervals to each other in the width direction are provided so as to correspond to the positioning marks 50.

Each slider mark 51 is formed as an opening portion to penetrate the thickness direction of the slider body 29, and serves as a reference to position the head slider 27 and the optical waveguide 19. For details, when the slider marks 51 and positioning marks 50 are aligned, the near-field light generating unit 35 and the slider-side optical waveguide 34 of the head slider 27, and the front end face 21 of the path 49 in the optical waveguide 19 are arranged in opposed relation in the thickness direction.

Further, in this method, in the arrangement described above, the slider marks 51 and the positioning marks 50 are aligned by the camera 43. That is, the head slider 27 is positioned with respect to the optical waveguide 19 so as to confirm the positioning marks 50 visually via the slider marks 51 from the camera 34.

After positioning, the head slider 27 is fixed on the upper surface of the pedestals 40 of the suspension board with circuit 1 via an adhesive or the like as required.

Thereafter, terminals of the magnetic head 44 are electrically connected with the head-side terminals 17.

Such a hard disk drive provided with the suspension board with circuit 1 including the head slider 27 adopts an optical assist system.

In the hard disk drive, as shown in FIG. 8, for example, the hard disk drive 26 runs relative to the near-field light generating unit 35 and the magnetic head 44.

Further, light emitted from the light emitting device 20 enters the rear end portion of the path 49 in the optical waveguide 19, and the entered light is transmitted toward the front side in the path 49, and the optical path is changed upward in the front end face 21 of the path 49, and then the light is emitted upward from the front end face 21 of the path 49. Thereafter, the light emitted from the path 49 enters the lower end portion of the slider-side optical waveguide 34, and transmitted upward in the slider-side optical waveguide 34, and emitted from the upper end portion of the slider-side optical waveguide 34, and then enters the near-field light generating unit 35. Then, the near-field light is generated in the near-field light generating unit 35 based on the irradiation of the light, and the near-field light is applied to the surface of the hard disk drive 26.

Further, in parallel with heating the surface of the hard disk drive 26 by irradiation of the near-field light from the near-field light generating unit 35, information is recorded on the surface of the hard disk drive 26 by irradiation of a magnetic field from the magnetic head 44. For details, by heating based on the irradiation of the near-field light from the near-field light generating unit 35, the coercive force on the surface of the hard disk drive 26 is reduced, and information is recorded at high density on the surface of the hard disk drive 26 by irradiation of a small magnetic field from the magnetic head 44.

According to the suspension board with circuit 1, the near-field light generating unit 35 and the slider-side optical waveguide 34 can be positioned accurately with respect to the optical waveguide 19 by the positioning marks 50. Therefore, light transmitted through the optical waveguide 19 can be surely applied to the near-field light generating unit 35 via the slider-side optical waveguide 34, and the hard disk drive 26 can be sufficiently heated.

As a result, information can be recorded on the hard disk drive 26 at high density and an optical assist system can be conducted surely.

Further, the optical waveguide 19 of the suspension board with circuit 1 has a strip loading structure. That is, in the core layer 23, when applying light to the opposite portion to the lower side of the over clad layer 24, the path 49 (cf. FIG. 2) which can transmit such light is formed along the over clad layer 24.

Further, since the positioning marks 50 are covered by the protective layer 28, it is possible to prevent contact with the outside when handling the suspension board with circuit 1 including the optical waveguide 19 and to prevent damage of the positioning marks 50 caused by contact with the head slider 27 on positioning of the head slider 27 with respect to the optical waveguide 19. Therefore, by the positioning marks 50, the near-field light generating unit 35 and the slider-side optical waveguide 34 can be positioned with respect to the optical waveguide 19 more accurately.

Therefore, light transmitted through the optical waveguide 19 can be applied to the near-field light generating unit 35 via the slider-side optical waveguide 34 more surely and the hard disk drive 26 can be heated more sufficiently.

As a result, information can be recorded on the hard disk drive 26 at higher density and an optical assist system can be conducted more surely.

Further, since the protective layer 28 is made of a transparent material, a high level of visibility of the positioning marks 50 from above can be ensured and the positioning marks 50 can be visually confirmed via the protective layer 28 by the camera 43 easily and surely. Thus, the relative position of the path 49 with respect to the positioning marks 50 can be recognized easily and surely.

As a result, the near-field light generating unit 35 and the slider-side optical waveguide 34 can be positioned accurately with respect to the path 49.

In the above description, the protective layer 28 covers both the positioning marks 50 and the over clad layer 24, but, for example, not shown, the protective layer 28 can also be formed so as to cover the positioning marks 50 only and to expose the over clad layer 24.

Preferably, the protective layer 28 covers both the positioning marks 50 and the over clad layer 24.

Thus, since the over clad layer 24 is covered by the protective layer 28, it is possible to prevent contact between the outside and the over clad layer 24 when handling the optical waveguide 19 and to prevent damage of the over clad layer 24 caused by contact between the head slider 27 and the over clad layer 24 on positioning.

Therefore, excellent optical connection reliability in the optical waveguide 19 can be ensured.

Further, in the optical waveguide 19 of the suspension board with circuit 1 described above, since a width of the over clad layer 24 is within the range described above, light transmitted through the optical waveguide 19, as single-mode light, can be applied to the near-field light generating unit 35 surely and efficiently and can heat the hard disk drive 26 surely and efficiently.

In the above description of FIG. 4, the positioning marks 50 are formed in a generally rectangular shape in plane view. However, the shape thereof is not particularly limited, and can also be formed in a proper shape, for example, not shown, a generally triangular shape in plane view and a generally circular shape in plane view or the like.

Further, in the above description, the slider marks 51 are disposed on the slider body 29. However, for example, not shown, the slider marks 51 can also be disposed on the slider-side optical waveguide 34 and/or the near-field light generating unit 35.

Figure 9:
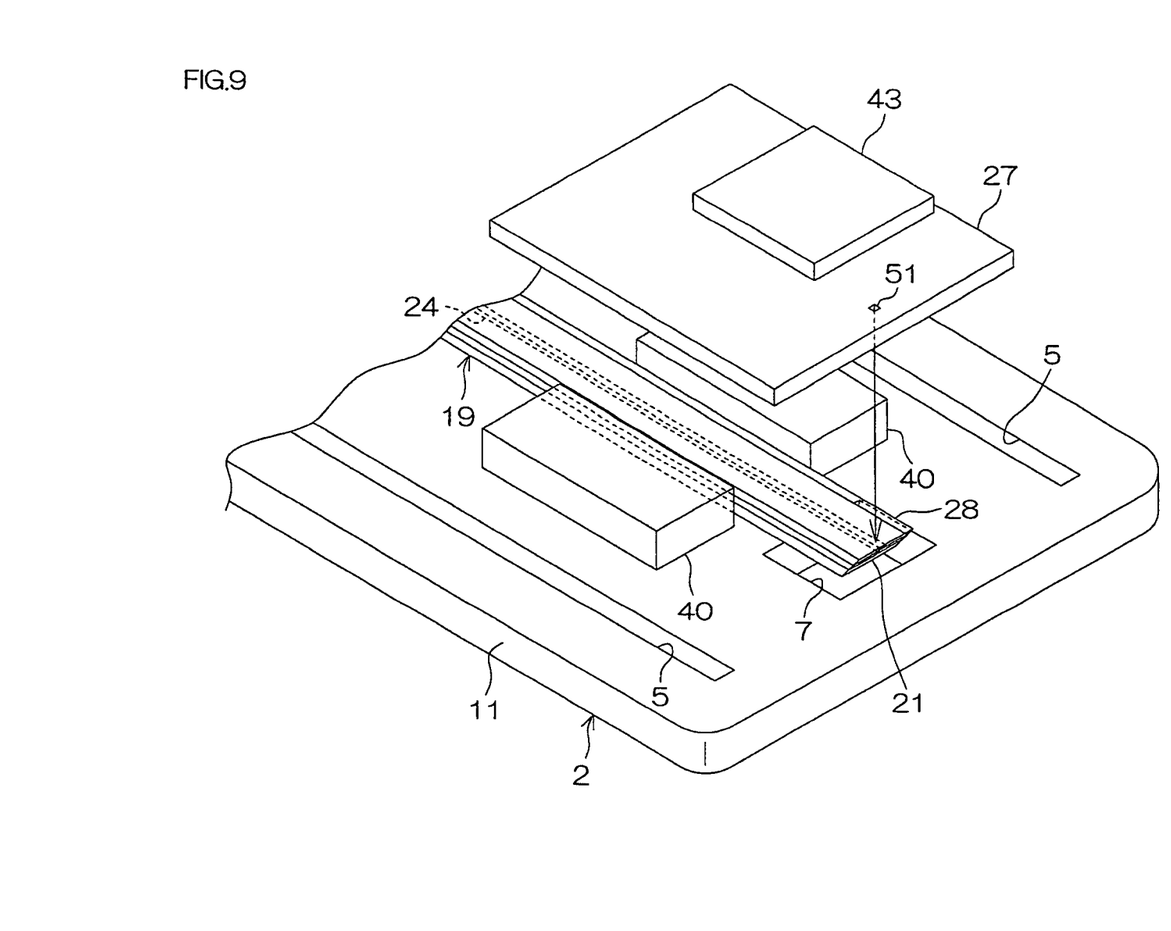
FIG. 9 is a perspective view for explaining a positioning of a head slider with respect to an optical waveguide of a suspension board with circuit of another embodiment (embodiment in which a positioning mark is not formed) according to the present invention.
Figure 10:
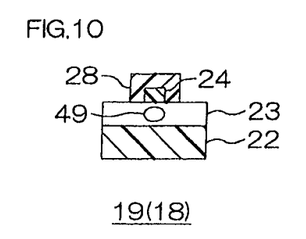
FIG. 10 is a sectional view of a suspension board with circuit of another embodiment (embodiment in which a protective layer covers an over clad layer only) according to the present invention.

FIG. 9 is an enlarged perspective view for explaining a positioning of a head slider with respect to an optical waveguide of a suspension board with circuit of another embodiment (embodiment in which a positioning mark is not formed) according to the present invention. FIG. 10 is a sectional view of a suspension board with circuit of another embodiment (embodiment in which a protective layer covers an over clad layer only) according to the present invention. In FIG. 9 and FIG. 10, the same reference numerals are used for members corresponding to those described above and the detailed description thereof is omitted.

In the above description, a positioning portion of the present invention is the positioning marks 50 which are disposed to be spaced apart from the over clad layer 24 and are used on positioning with respect to the optical waveguide 19.

However, as shown in FIG. 9, it is also possible not to use the positioning marks 50 and use the front end portion itself of the over clad layer 24 as a positioning portion in order to position the near-field light generating unit 35 and the slider-side optical waveguide 34 with respect to the optical waveguide 19.

In FIG. 9, a slider mark 51 is provided so as to correspond to the front end portion of the over clad layer 24.

The over clad layer 24 has a refractive index described above and is formed so as to be included in the core layer 23 in plane view.

Further, the protective layer 28 covers the over clad layer 24 on the core layer 23. The protective layer 28 is formed so that both widthwise end edges are in the same positions in plane view as those of the core layer 23.

Since the protective layer 28 is made of a transparent material described above, the over clad layer 24 can be visually confirmed from above via the protective layer 28 easily. Therefore, in the alignment of the front end portion of the optical waveguide 19 and the slider marks 51, the front end portion of the over clad layer 24 can be confirmed visually by the camera 43 via the slider marks 51 and the protective layer 28. As a result, the positioning of the head slider 27 with respect to the optical waveguide 19 can be conducted surely.

Preferably, a positioning portion is the positioning marks 50 and the positioning marks 50 are used on positioning of the head slider 27 with respect to the optical waveguide 19.

With the use of the positioning marks 50, since the positioning marks 50 are disposed to be spaced apart from the over clad layer 24, a displacement of the relative position of the path 49 with respect to the positioning marks 50 in plane view can be easily recognized.

Therefore, the near-field light generating unit 35 and the slider-side optical waveguide 34 can be positioned more accurately with respect to the path 49.

In the above description of FIG. 9, the protective layer 28 is formed so that both widthwise end edges of the protective layer 28 are in the same positions in plane view as those of the core layer 23. However, for example, as shown in FIG. 10, the protective layer 28 can also be formed so that the surface of the over clad layer 24, that is, both widthwise side surfaces and the upper surface of the over clad layer 24 only are covered therewith, and both widthwise end portions of the upper surface of the core layer 23 are exposed therefrom.

Further, in forming the optical waveguide 19, as shown in FIG. 5(b) to FIG. 5(d), FIG. 6(e) and FIG. 6(f) described above, each of the under clad layer 22, the core layer 23 and the over clad layer 24 is formed by exposure via the photomask 38 and development of a photosensitive film. However, for example, a metal mold is prepared, and a varnish is poured thereto and then is dried to thereby form a film in the above-mentioned shape, and then the film is cured to thereby form the under clad layer 22, the core layer 23 and the over clad layer 24, respectively. Further, the positioning marks 50 and the protective layer 28 are formed by using the same method as described above.

Preferably, each of the under clad layer 22, the core layer 23 and the over clad layer 24 is formed by exposure via the photomask 38 and development of a photosensitive film. Particularly, when the over clad layer 24 and the positioning marks 50 are formed by exposure via the photomask 38 and development of a photosensitive film 39, the over clad layer 24 and the positioning marks 50 can be formed simultaneously by one-time exposure via a photomask 38 to achieve relative arrangement of these with accuracy.

Therefore, the near-field light generating unit 35 and the slider-side optical waveguide 34 can be positioned more accurately with respect to the path 49.

Further, in the above description, the near-field light generating unit 35 is disposed on the head slider 27. However, not shown, for example, the near-field light generating unit 35 can also be directly disposed on the back side of the suspension board with circuit 1, and light transmitted through the optical waveguide 19 can also be directly applied to the near-field light generating unit 35 without letting the transmitted light pass through the slider-side optical waveguide 34.

On the other hand, when the near-field light generating unit 35 is disposed on the head slider 27, the head slider 27 is provided with both the near-field light generating unit 35 and the magnetic head 44, and then an optical assist system can be conducted surely. Further, in the above description, the optical waveguide 19 is directly disposed on the upper surface of the metal supporting board 11. However, not shown, for example, the optical waveguide 19 can also be disposed on the upper surface of the metal supporting board 11 via an adhesive layer.

That is, the optical waveguide 19 is prepared separately from the circuit board 2.

To prepare the optical waveguide 19, the under clad layer 22, the core layer 23, both of the over clad layer 24 and the positioning marks 50, and the protective layer 28 are sequentially laminated on a release sheet such as a polyethylene terephthalate (PET) sheet, which is not shown. Thereafter, the optical waveguide 19 is removed from the release sheet.

Next, the optical waveguide 19 adheres onto the metal supporting board 11 via an adhesive layer.

Thus the optical waveguide 19 can be easily disposed on the upper surface of the metal supporting board 11 by letting the optical waveguide 19 laminate on the upper surface of the metal supporting board 11 via an adhesive layer. Therefore, the production cost can be reduced.

Additionally, the optical waveguide 19 prepared separately is provided with the protective layer 28, so that the positioning marks 50 and the over clad layer 24 are protected by the protective layer 28 on handling the optical waveguide 19 and on adhering to the circuit board 2, and the damage of the positioning marks 50 and the over clad layer 24 can be prevented.

While the illustrative embodiments of the present invention are provided in the above description, such is for illustrative purpose only and it is not to be construed limitative. Modification and variation of the present invention that will be obvious to those skilled in the art is to be covered by the following claims.

What is claimed is:

1. A suspension board with circuit comprising:
a circuit board comprising a metal supporting board; an insulating layer formed on the metal supporting board; and a conductive layer formed on the insulating layer; and
an optical waveguide disposed on the circuit board;
wherein the optical waveguide comprising:
an under clad layer; and
a core layer formed on the under clad layer; and
an over clad layer formed on the core layer and included in the core layer when projected in the thickness direction of the core layer;
wherein the optical waveguide is provided with a positioning portion to position the optical waveguide with respect to a near-field light generating unit for generating a near-field light by a light emitted from the optical waveguide, and a protective layer to cover the positioning portion, and
wherein the circuit board is provided with a slider.

2. The suspension board with circuit according to claim 1, wherein the protective layer is made of a transparent material.

3. The suspension board with circuit according to claim 1, wherein the protective layer covers the over clad layer.

4. The suspension board with circuit according to claim 1, wherein the positioning portion is disposed to be spaced apart from the over clad layer.

5. The suspension board with circuit according to 1, wherein the over clad layer extends in a lengthwise direction and a width thereof in the direction perpendicular to the lengthwise direction is 10 μm or less.

6. The suspension board with circuit according to claim 1, wherein the near-field light generating unit is provided in a head slider provided with a magnetic head.

7. A suspension board with circuit comprising:
a circuit board comprising a metal supporting board; an insulating layer formed on the metal supporting board; and a conductive layer formed on the insulating layer; and
an optical waveguide disposed on the circuit board;
wherein the optical waveguide comprising:
an under clad layer; and
a core layer formed on the under clad layer; and
an over clad layer formed on the core layer and included in the core layer when projected in the thickness direction of the core layer;
wherein the optical waveguide is provided with a positioning portion to position the optical waveguide with respect to a near-field light generating unit for generating a near-field light by a light emitted from the optical waveguide, and a protective layer to cover the positioning portion, and
wherein the positioning portion is disposed to be spaced apart from the over clad layer.

* * * * *